(12) United States Patent
Wang et al.

(10) Patent No.: US 6,221,432 B1
(45) Date of Patent: Apr. 24, 2001

(54) ERADICABLE INKS

(76) Inventors: Yichun Wang, 2 Robert Cohen Dr., Canton, MA (US) 02021; Russell E. Hopson, 10467 Courthouse Rd., Fairfax, VA (US) 22030

( * ) Notice: Subject to any disclaimer, the term of this patent is extended or adjusted under 35 U.S.C. 154(b) by 0 days.

(21) Appl. No.: 09/301,491

(22) Filed: Apr. 28, 1999

Related U.S. Application Data

(63) Continuation of application No. 08/823,416, filed on Mar. 25, 1997, now Pat. No. 5,916,357.

(51) Int. Cl.⁷ ........................................................ B05D 3/10
(52) U.S. Cl. ............................................. 427/337; 427/340
(58) Field of Search ................................. 427/1, 466, 337, 427/258, 261, 145, 340; 252/183.13; 101/491; 106/31.32, 31.64

(56) References Cited

U.S. PATENT DOCUMENTS

| | | |
|---|---|---|
| 2,559,608 | 7/1951 | Ehrlich . |
| 3,468,679 * | 9/1969 | Furlotti . |
| 3,635,652 | 1/1972 | Streck . |
| 3,705,045 | 12/1972 | Nadolski . |
| 3,834,823 | 9/1974 | Seregely et al. . |
| 3,875,105 | 4/1975 | Daugherty et al. . |
| 3,886,083 | 5/1975 | Laxer . |
| 3,941,488 | 3/1976 | Maxwell . |
| 3,945,837 * | 3/1976 | Miyata et al. . |
| 4,097,290 | 6/1978 | Muller et al. . |
| 4,101,329 | 7/1978 | Loock . |
| 4,130,435 | 12/1978 | Hall . |
| 4,139,965 | 2/1979 | Curry et al. . |
| 4,156,657 | 5/1979 | Lin . |
| 4,171,982 | 10/1979 | Lin . |
| 4,198,445 * | 4/1980 | Sokol et al. . |
| 4,213,717 | 7/1980 | Lin . |
| 4,227,930 | 10/1980 | Lin . |
| 4,228,028 | 10/1980 | Lin . |
| 4,252,845 | 2/1981 | Griffiths et al. . |
| 4,262,936 | 4/1981 | Miyamoto . |
| 4,329,262 | 5/1982 | Muller . |
| 4,329,264 | 5/1982 | Muller . |
| 4,349,639 | 9/1982 | Muller . |
| 4,357,431 | 11/1982 | Murakami et al. . |
| 4,367,966 | 1/1983 | Williams et al. . |
| 4,389,499 | 6/1983 | Riesgraf . |
| 4,390,646 | 6/1983 | Ferguson . |
| 4,391,927 | 7/1983 | Farmer, III . |
| 4,410,643 | 10/1983 | Muller . |
| 4,419,464 | 12/1983 | Williams et al. . |
| 4,557,618 | 12/1985 | Iwata et al. . |
| 4,578,117 | 3/1986 | Nakanishi . |
| 4,606,769 | 8/1986 | Tanaka et al. . |
| 4,629,748 | 12/1986 | Miyajima et al. . |
| 4,681,471 | 7/1987 | Hayduchok et al. . |
| 4,687,791 | 8/1987 | Miyajima et al. . |
| 4,721,739 | 1/1988 | Brenneman et al. . |
| 4,732,614 | 3/1988 | Brooks et al. . |
| 4,830,670 | 5/1989 | Danyu . |
| 4,940,628 | 7/1990 | Lin et al. . |
| 4,941,923 | 7/1990 | Sotogoshi et al. . |
| 5,006,171 | 4/1991 | Mecke et al. . |
| 5,043,013 | 8/1991 | Kluger et al. . |
| 5,059,244 | 10/1991 | King et al. . |
| 5,116,410 | 5/1992 | Miller . |
| 5,232,494 | 8/1993 | Miller . |
| 5,324,131 | 6/1994 | Gardner, III . |
| 5,326,388 | 7/1994 | Miller et al. . |
| 5,352,282 | 10/1994 | Miller . |
| 5,378,752 | 1/1995 | White et al. . |
| 5,389,717 | 2/1995 | Santini et al. . |
| 5,423,907 | 6/1995 | Morikubo et al. . |
| 5,427,278 | 6/1995 | Gardner, III . |
| 5,460,647 | 10/1995 | Snedeker et al. . |
| 5,464,470 | 11/1995 | Brachman et al. . |
| 5,478,382 | 12/1995 | Miller et al. . |
| 5,486,228 | 1/1996 | Miller et al. . |
| 5,637,638 | 6/1997 | Chandler et al. . |
| 5,649,999 | 7/1997 | Wang . |
| 5,661,197 | 8/1997 | Villiger et al. . |
| 5,711,790 | 1/1998 | Coller . |

FOREIGN PATENT DOCUMENTS

| | | |
|---|---|---|
| 2216951 * | 10/1973 | (DE) . |
| 2 216 951 | 10/1973 | (DE) . |
| 23 49 086 A1 | 4/1975 | (DE) . |
| 27 24 820 A1 | 12/1978 | (DE) . |
| 28 34 459 A1 | 3/1980 | (DE) . |
| 2616259 C3 | 12/1981 | (DE) . |
| 3919-588 | 6/1988 | (DE) . |
| 0 032 653 A2 | 12/1979 | (EP) . |
| 0 032 652 A2 | 7/1981 | (EP) . |
| 0 551 913 A1 | 1/1992 | (EP) . |
| 2 391 258 | 5/1977 | (FR) . |
| 55-50075 | 10/1978 | (JP) . |
| 55-152769 | 5/1979 | (JP) . |
| 56-98268 | 12/1979 | (JP) . |
| 57-16077 | 7/1980 | (JP) . |
| 58-63765 | 10/1981 | (JP) . |
| 5 8162-675 | 3/1982 | (JP) . |
| 57-198768 | 12/1982 | (JP) . |
| 63-48374 | 8/1986 | (JP) . |
| 6 3175-082 | 7/1987 | (JP) . |
| 2009-570 | 10/1988 | (JP) . |
| 1-299880 * | 12/1989 | (JP) . |
| 5-32926 | 2/1993 | (JP) . |

\* cited by examiner

*Primary Examiner*—Fred J. Parker
(74) *Attorney, Agent, or Firm*—Marshall, O'Toole, Gerstein, Murray & Borun

(57) ABSTRACT

A method of changing the color of an ink mark includes applying an ink including a solvent and a triarylmethane dye dissolved in the solvent that changes color if contacted with a chemical agent to a substrate. The dye is soluble in phenyl cellosolve. A chemical agent is then applied to cause the dye to change color.

9 Claims, No Drawings

ERADICABLE INKS

This application is a continuation of U.S. application Ser. No. 08/823,416, filed Mar. 25, 1997, now U.S. Pat. No. 5,916,357.

BACKGROUND OF THE INVENTION

The invention relates to eradicable inks.

Ink eradicator systems generally include two components. One component is an aqueous ink that includes a dye—typically a triarylmethane—that can be converted to a colorless form when contacted with a substance such as a sulfite reducing agent or an amine. The second component is an aqueous eradicator fluid that includes a substance that can cause the dye to convert to a colorless form. A user writes with the ink and, if correction is necessary, applies the eradicator fluid to the ink marking to decolorize the dye.

Aqueous inks used in eradicator systems often are not waterfast. In addition, aqueous inks may have a low viscosity, and low viscosity inks can be more prone to leakage than higher viscosity inks. Finally, writing instruments containing aqueous inks often include a cap so that the ink does not dry out when the pen is not being used.

Inks that are used in ball-point pens typically include largely non-volatile organic solvents, such as benzyl alcohol, phenyl cellosolve, diethylene glycol monoethyl ether, dipropylene glycol, glycerin, and propylene glycol. Ball-point pen inks tend to have a relatively high viscosity (e.g., greater than 10,000 cps).

An example of a triarylmethane that has been used in aqueous eradicable inks is Acid Blue 93, which has the following structure:

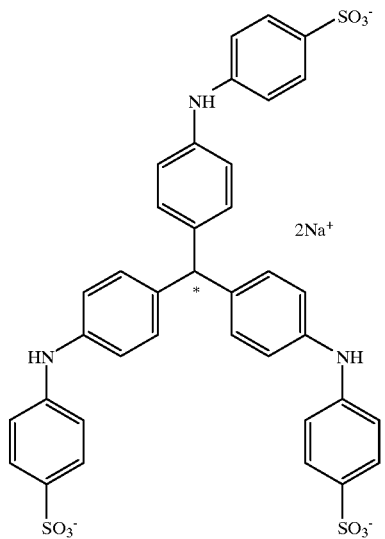

Acid Blue 93 is not significantly soluble in many of the non-volatile organic solvents commonly used in ball-point pen inks.

SUMMARY OF THE INVENTION

The invention features an eradicable ink that can be used, for example, in ball-point pens. The ink contains a colorant, preferably a triarylmethane dye, that changes color (e.g., decolorizes) when contacted with a chemical agent such as a sulfite or an amine. The preferred colorants are soluble in common non-volatile organic solvents used in ball pen ink, like benzyl alcohol, phenyl cellosolve, diethylene glycol, monoethyl ether, dipropylene glycol, glycerin, and/or propylene glycol. Because the colorant can be dissolved in non-volatile organic solvents, the colorant can be incorporated into an eradicable ink that can be used effectively in ball-point pens. The solvent preferably contains essentially no water. Preferred inks containing essentially no water are waterfast and are not prone to dry out. The eradicable ink also has a viscosity, for example, of greater than 10,000 cps at 25° C., and as a result, preferred inks can be used in ball-point pens without significant leakage.

The invention also features the combination of the eradicable ink and an eradicator fluid. The eradicator fluid may include an aqueous solvent and/or a non-aqueous solvent and a chemical agent like a sulfite or an amine that can cause the dye in the ink to change color (e.g., decolorize).

The invention also features triarylmethane dyes that can be used in eradicable inks containing non-volatile organic solvents. The dyes include a counterion—preferably a hydrophobic counterion—that provides the dye with solubility in the non-volatile organic solvents. Examples of preferred counterions include n-alkylpyridinium salts, tetraalkyl ammonium salts, and tetraalkyl phosphonium salts.

The invention also features a method of synthesizing a colorant that is soluble in a selected organic solvent, for example, a non-volatile organic solvent that can be used in a ball-point pen ink, from a colorant that is insoluble in the organic solvent. The starting colorant contains an ionic colorant portion and a counterion. The method includes replacing the counterion in the starting colorant with a counterion that renders the colorant soluble in the organic solvent.

The invention also features a method of synthesizing a water insoluble colorant from a water soluble colorant. The starting colorant contains an ionic portion and a counterion, and the method involves replacing the counterion with a different counterion that is sufficiently hydrophobic to render the colorant insoluble in water.

"Triarylmethane dye", as used herein, means a dye that includes three aryl groups covalently bonded to a methyl group. Each aryl group may have, for example, a sulfonate group ($SO_3^-$) attached.

"Changes color if contacted with a sulfite or an amine", as used herein, means that the colorant changes to a different color or decolorizes if contacted with a sulfite and/or an amine.

"Insoluble", as used herein, means that the dye does not dissolve in the solvent in sufficient quantity to cause a significant color change in the solvent.

"Soluble", as used herein, means that the dye dissolves in solvent in sufficient quantity to cause a significant color change in the solvent at 25° C.

"Eradication system", as used herein, means that an eradicable ink and an eradicator fluid combination are stored unmixed in the same general packaging. For example, the ink can be in one container and the eradicator fluid in another, but the two containers are included in the same package.

"Non-volatile organic solvent", as used herein, means an organic solvent that exhibits no appreciable mass loss due to vaporization at up to 100° F. at 1 atm.

"Essentially non-aqueous solvent", as used herein, means a solvent that contains less than 10% water by weight. Preferred solvents for the eradicable inks contain less than 5% water by weight, more preferably less than 2% water by weight, and most preferably no water.

Other features and advantages of the invention will be apparent from the description of the preferred embodiment thereof, and from the claims.

DESCRIPTION OF THE PREFERRED EMBODIMENTS

A preferred eradicable ink contains a non-volatile organic solvent, a triarylmethane dye dissolved in the non-volatile organic solvent, a polymer, and an organic acid. The ink may also include ingredients like surfactants, anti-oxidants, preservatives, etc. It does not contain water.

Enough non-volatile organic solvent should be included in the ink to dissolve the other components and provide the ink with the desired viscosity. Preferred inks have a viscosity of between 10,000 cps and 18,000 cps, and more preferably have a viscosity of between 14,000 cps and 16,000 cps, at 25° C. Preferred inks include between 40% and 80% of the non-volatile organic solvent by weight. Examples of suitable non-volatile organic solvents include benzyl alcohol, phenyl cellosolve, diethylene glycol monoethyl ether, dipropylene glycol, glycerin, and propylene glycol. The non-volatile organic solvent may consist of a single solvent or mixtures of two or more solvents.

The polymer provides adhesion between the ink and the writing surface, and can also be used to adjust the viscosity of the ink. Enough polymer should be included in the ink to provide the desired benefit, but not so much should be included that the viscosity of the ink becomes undesirably high. Inks may include, for example, between 5% and 30% of the polymer by weight. The quantity of polymer used can depend in part on the molecular weight and rheology properties of the particular polymer. Examples of suitable polymers include ketone formaldehyde resins.

The organic acid increases the acidity of the eradicable ink and as a result increases the color intensity of the triarylmethane dye. Examples of organic acids include citric acid and tartaric acid. A sufficient quantity of the organic acid should be included to provide an ink including a dye of the desired intensity. Preferred inks may include between 1% and 3%, and more preferably approximately 2%, of the organic acid by weight.

The triarylmethane dye decolorizes when contacted with a sulfite or an amine. Enough dye should be included in the ink to provide the desired color intensity, but not so much that large quantities of eradicator fluid must be applied to a mark made with the ink to cause it to decolorize. Preferred inks may include between 10% and 45%, more preferably approximately 20% to 35%, and most preferably about 30%, of the triarylmethane dye by weight.

The triarylmethane dye includes a relatively hydrophobic counterion that renders the dye soluble in the non-volatile organic solvent. The dye can be prepared from conventional decolorizable triarylmethane dyes, such as Acid Blue 93, Acid Blue 90, and Acid Blue 22 that are water soluble and not soluble in non-volatile organic solvents commonly used in ball-point pen inks. Acid Blue 93, for example, includes two sodium counterions. These counterions can be replaced with relatively hydrophobic counterions such as n-alkyl pyridinium salts, tetraalkyl ammonium salts, tetraalkyl phosphonium salts, P,P-alkylene bis(trialkyl phosphonium) salts, and N,N-alkylene bis(trialkyl ammonium) salts. The alkyl groups may contain, for example, from 4 to 20 carbon atoms. The alkyl substituents in a given salt may be the same or different.

An example of a triarylmethane dye including a tetraalkyl phosphonium counterion (R: Ph or Bu) is shown below (ABPh$_3$P or ABBu$_3$P):

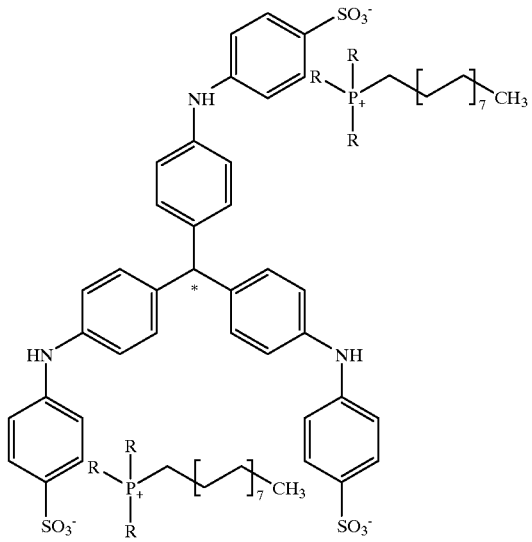

An example of a triarylmethane dye including another bisphosphonium salt (P,P'-hexadecyl bis(tributyl phosphonium)salt) is shown below (ABBisBu$_3$P):

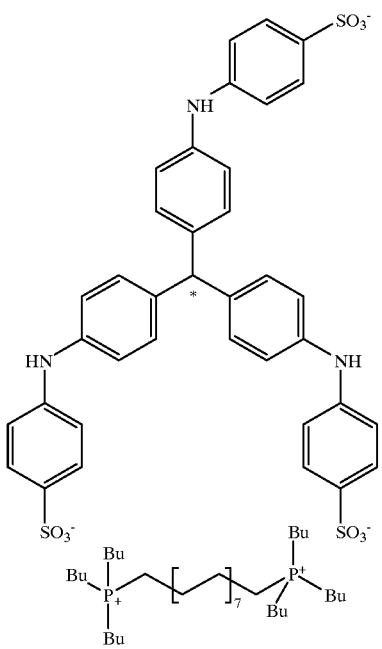

An example of a tetraalkylphosphonium and tetraalkyl ammonium salt is shown below (x can be P or N) (ABBu$_4$P or ABBu$_4$N):

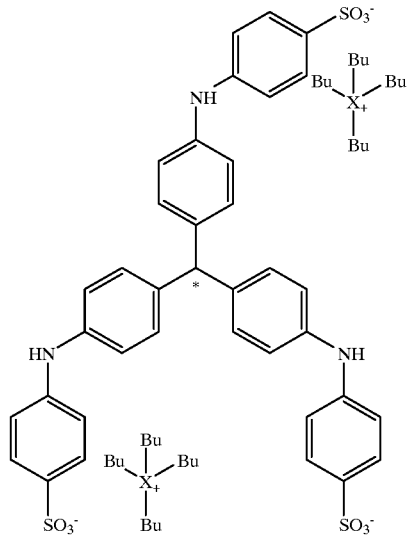

Finally, an example of a triarylmethane dye including a n-alkylpyridinium salt is shown below (ABPy):

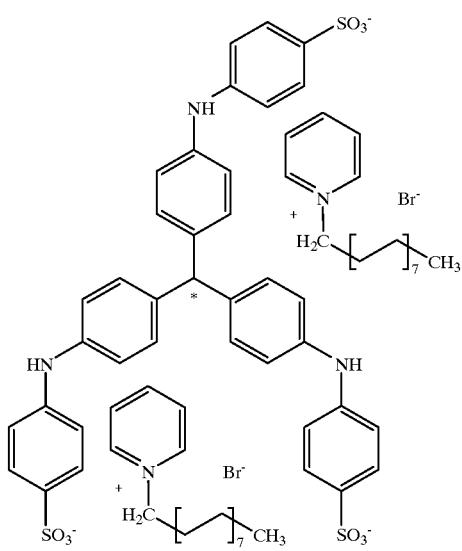

The solubilities of the five salts in isopropyl alcohol, benzyl alcohol, phenyl cellosolve, and water are provided in Table 1.

TABLE I

| Code | IPA | BenAl | PhCel | H$_2$O |
|---|---|---|---|---|
| ABPh$_3$P | + | + | + | − |
| ABBu$_3$P | + | + | + | − |
| ABBisBu$_3$P | − | + | + | − |
| ABPy | + | + | + | − |
| ABBu$_4$P | + | + | + | + |
| ABBu$_4$N | + | + | + | + |

The triarylmethane dyes can be prepared according to the following procedure:

I. Prepare a 0.06M solution of Acid Blue 93 by dissolving an appropriate quantity of the disodium salt in water with heat and stirring.

II. Dissolve two molar equivalents of the counterion to be exchanged with the sodium in Acid Blue 93 into a minimal amount of water with heat and stirring. Once all the material has dissolved, add sodium chloride.

III. Pour the saturated sodium chloride/counterion exchange salt solution into the highly concentrated Acid Blue 93 solution. Depending on the solubility of the product, an immediate precipitate may or may not form. Continue heating and stirring the solution until a precipitate begins to form on the surface. If no precipitate is forming after a long period of heating and stirring, NaCl can be added to the solution to encourage precipitation. Remove the precipitate from the surface with a spatula, taking care to allow any of the liquid to drip back into the beaker. Place the precipitate on teflon coated aluminum foil and place it in a vacuum oven over night (house vacuum and low heat ~60° C.). The remaining solution can be concentrated further by heating and stirring and/or NaCl can be added. Any further precipitate should be treated as described previously.

IV. Remove brittle dry dye salt from the vacuum oven and crush it into fine particles. If the newly formed dye is insoluble in water, wash the fine powder with water till the filtrate no longer is blue in color. Repeat the vacuum oven step, and determine yield. If the dye is water soluble, determine its organic solvent solubility. Once a suitable solvent has been chosen (i.e., NaCl insoluble), dissolve the dye in that solvent, filter the solution, and concentrate and pump the desired dye product.

The eradicable ink may be prepared by simply mixing the components. The solvents may be mixed first, and then the polymer, dye and other components mixed in. The following examples of eradicable inks were prepared; the additional dyes listed previously may also be used.

| Example 1 | |
|---|---|
| Diethylene glycol monoethyl ether | 20.8% |
| Phenyl cellosolve | 20.8% |
| Dipropylene glycol | 13.6% |
| Citric acid | 1.7% |
| Polymer (e.g., Resin SK, available from Huls America Inc.) | 12.8% |
| Dye (ABPyHex) | 30.0% |
| PVP K-90 (available from General Aniline and Film Corporation) | 0.6% |
| Example 2 | |
| Diethylene glycol monoethyl ether | 20.8% |
| Phenyl cellosolve | 20.8% |
| Dipropylene glycol | 13.6% |
| Citric acid | 1.7% |
| Resin SK | 13.6% |
| ABHexPh$_3$P | 30% |
| PVP K-90 | 0.6% |

The eradicable ink can be used in a ball-point pen. A ball-point pen includes a reservoir containing the ink; a tubular body; a socket, having a seat at one end of the tubular body, an interior wall surface extending from the seat; a rim disposed at the end of the interior wall surface; and a spherical ball that is dispersed in the socket, rotatably engagable with the seat and captured by the rim. The eradicable ink may also be used in other types of writing instruments.

The eradicable ink is used in combination with an eradicator fluid. The eradicable fluid may include water or an organic solvent as the primary solvent, a sulfite or an amine (e.g., sodium glycinate) that can cause the triarylmethane dye to decolorize, a film-forming polymer, and, optionally, other conventional ingredients. Enough sulfite or amine should be included in the fluid to decolorize the dye when the fluid is applied to the ink. The fluid may contain for example, between 2% and 5% of sulfite by weight, or between 7% and 12% of the amine by weight. The eradicator fluid may contain, for example, between 15% and 25% of the polymer by weight.

The eradicator fluid also preferably contains a buffer to maintain the pH of the solution at, for example, between 11 and 12 (more preferably at approximately 11.7). Preferred eradicator fluids may include, for example, between 75% and 85% of the aqueous buffer solution by weight.

The eradicator fluid may be prepared by mixing the ingredients together. An eradicator fluid may contain, for example, 10% sodium glycinate, 20% polyacrylic acid sodium salt (available from Aldrich, cat. no. 42034-4), and 70% of an aqueous buffer solution (pH 11.7). One liter of the buffer solution can include 1.4841 of boric acid, 4.1050 g of sodium hydroxide, 1.4 ml of acetic acid, and 1.4 ml of phosphoric acid.

Another eradicator fluid may contain, for example, 3% sodium sulfite, 5% triethanolamine, 20% polyacrylic acid sodium salt, and 70% pH 10.5 buffer solution.

The eradicator fluid may be loaded into a writing instrument and then applied to an erroneous mark made with the eradicable ink to decolorize the mark.

The eradicable ink and the eradicator fluid may be supplied in separate pens. If desired, several eradicable ink-containing pens may be provided, each pen containing a different eradicable ink. The eradicable ink and the eradicator fluid also may be supplied in a single pen, containing a reservoir for each.

The eradicable ink and eradicator fluid also may be provided as part of an eradication system.

Other embodiments are within the claims.

What is claimed is:

1. A method of changing the color of an ink mark, comprising applying an ink comprising an essentially non-aqueous solvent and a triarylmethane dye including a hydrophobic organic counterion dissolved in said solvent that changes color if contacted with a chemical agent to a substrate to provide an ink mark, and applying said chemical agent to said ink mark to cause said triarylmethane dye to change color.

2. The method of claim 1, wherein said chemical agent comprises a sulfite.

3. The method of claim 1, wherein said chemical agent comprises an amine.

4. The method of claim 1, wherein said ink is provided in a ball-point pen and said ink is applied to said substrate by writing on said substrate with said ball-point pen to transfer said ink to said substrate.

5. The method of claim 1, wherein said solvent comprises a non-volatile organic solvent.

6. A method of changing the color of an ink mark, comprising applying and ink comprising a solvent and a triarylmethane dye dissolved is said solvent that changes color if contacted with a chemical agent to a substrate to provide an ink mark, said triarylmethane dye being soluble in phenyl cellosolve, and applying said chemical agent to said ink mark to cause said triarylmethane dye to change color.

7. The method of claim 6, wherein said chemical agent comprises a sulfite.

8. The method of claim 6, wherein said chemical agent comprises an amine.

9. The method of claim 6, wherein said ink is provided in a ball-point pen and said ink is applied to said substrate by writing on said substrate with said ball-point pen to transfer said ink to said substrate.

* * * * *